United States Patent Office 3,267,375
Patented August 16, 1966

3,267,375
SYSTEM FOR MEASURING PULSE POWER LEVELS WITH A PLURALITY OF GATE CONTROLLED PULSE LEVEL COMPARATOR CHANNELS
Charles F. Olsen, Baltimore, Md., assignor, by mesne assignments to the United States of America as represented by the Secretary of the Navy
Filed May 10, 1962, Ser. No. 193,884
4 Claims. (Cl. 324—103)

This invention relates to a system for measuring pulse power levels, and more particularly to a system capable of determining the occurrence of a plurality of pulse power levels.

There are two manners in which to describe the power of a pulse system. One is to specify the average power and the other manner is to specify the peak power of the pulse. In pulse systems, it is the peak power, however, that is of prime importance because that is the power which will determine the range or distance between the target and the radar, the sonar or other pulse systems over which the equipment will operate for a given receiver sensitivity. Even though the average power may be measured with conventional power meters (RF), in such a case the pulse width and repetition rate must be accurately known in order to determine the peak power. Even in such a case, the conversion of the average power measured back to peak power allows for large errors when, as is the usual case, the duty cycle is low.

This invention measures pulse power levels by employing a burst of energy fed into a dummy load from the transmitter. From the dummy load a portion of the transmitted pulse is detected and employed to trigger a one-shot multivibrator. The detected pulse is furthermore fed to power level comparator circuits, which also contain one-shot multivibrators and which are, in turn, triggered only when the incoming pulse rises above the given value predetermined by a reference voltage placed upon the comparator circuits. The outputs from the power level comparator circuits as well as a gate circuit are fed into a logic circuit which selects a visual marker for indicating the level of pulse power.

Accordingly, an object of the present invention is the provision of a system for measuring pulse power levels which employs a sample of a transmitted pulse to energize pulse power level indicators.

Another object is to provide a measuring system employing level comparators responsive to a sample of a transmitted pulse for energizing pulse power level indicators.

A further object of the invention is the provision of a measuring system capable of measuring peak power transmitted by a transmitter by sensing the pulse power levels thereof and gating these signals to logic circuits for initiating and indicating the pulse power levels.

Figure 1:
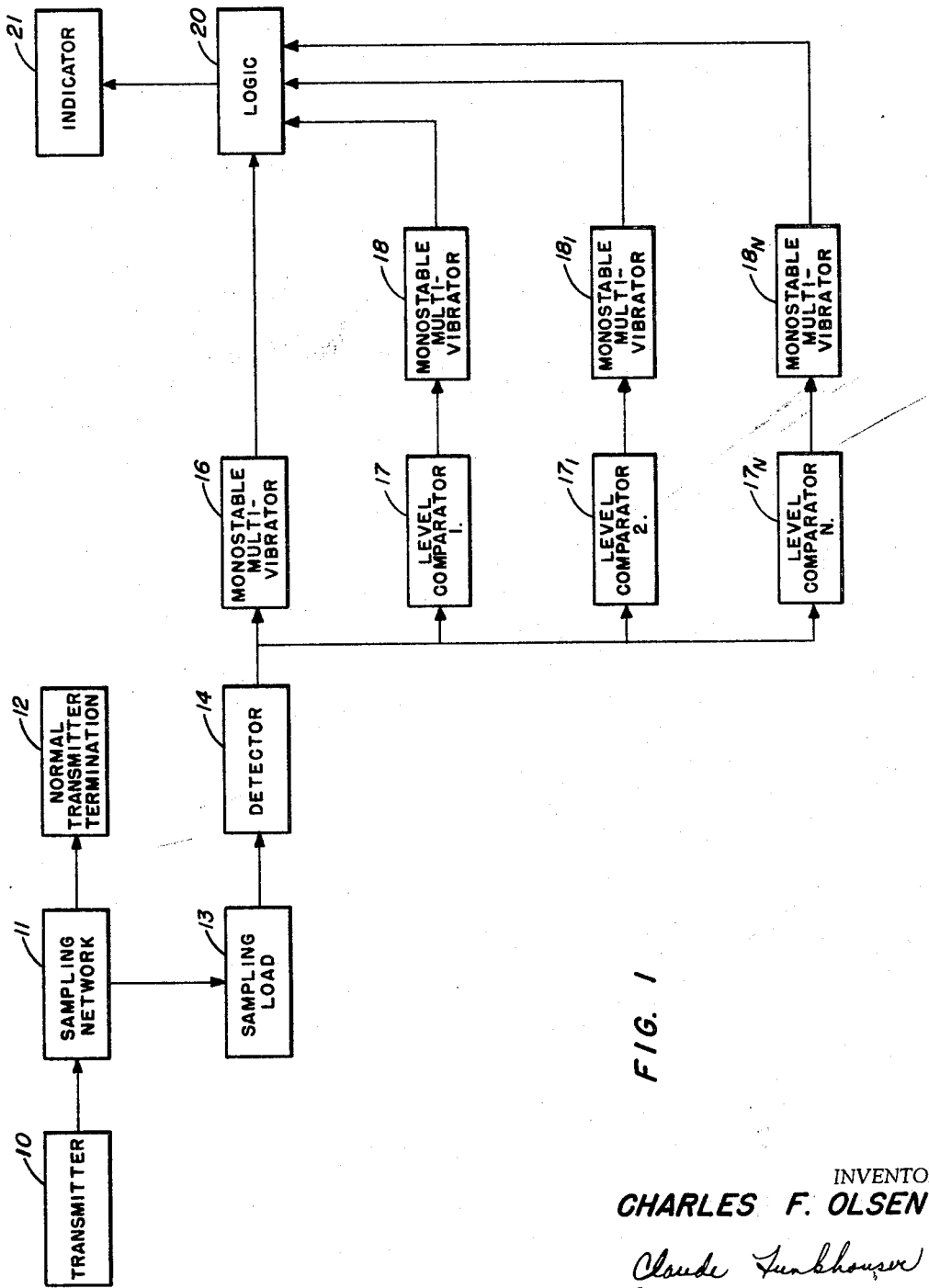
Figure 2:
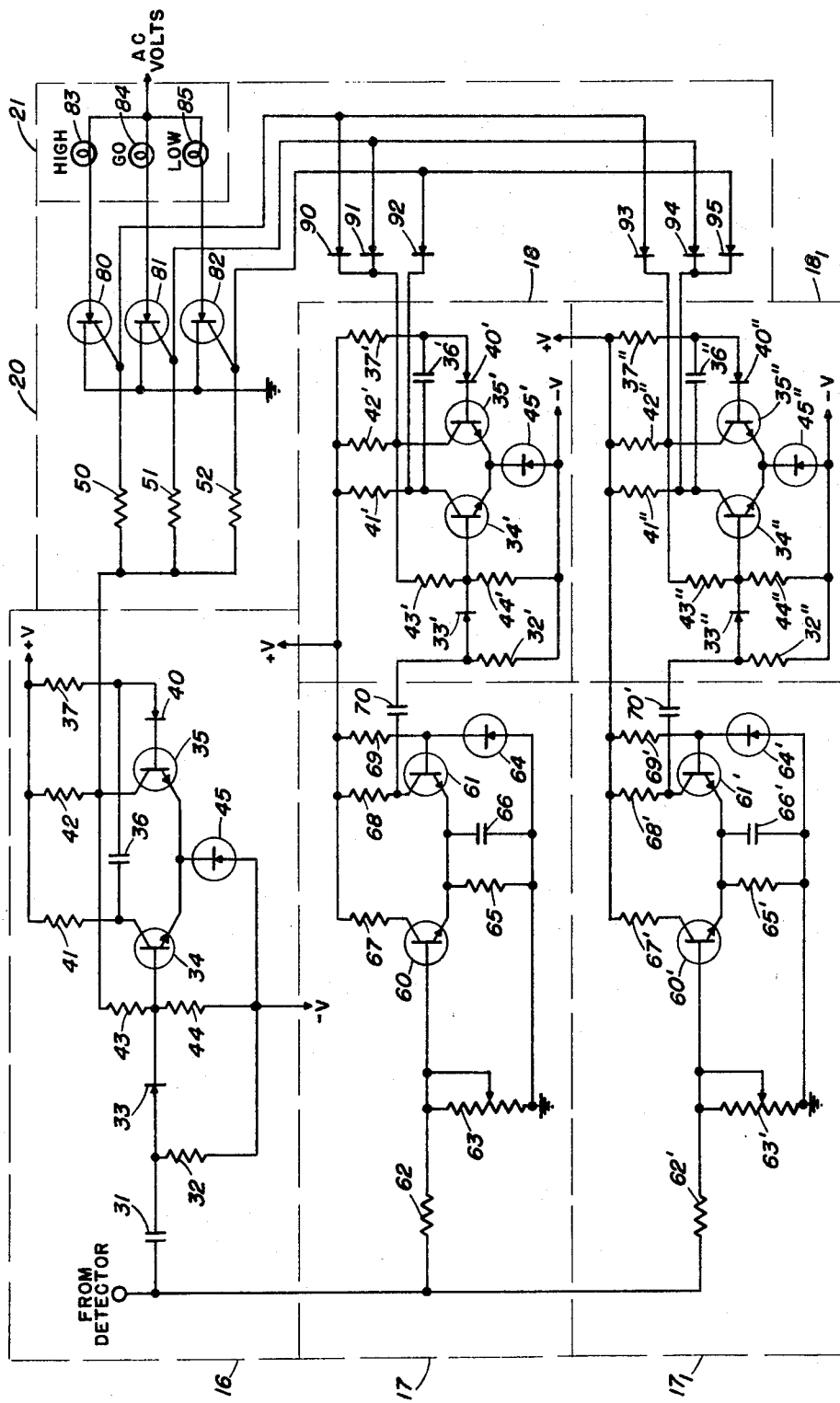

Other objects and many of the attendant advantages of this invention will be readily appreciated as the same becomes better understood by reference to the following detailed description when considered in connection with the accompanying drawings wherein:

FIG. 1 is a block diagram of a system in accordance with the invention which measures the peak power output of a pulse modulated system; and FIG. 2 is a schematic diagram of a system in accordance with the invention for indicating whether the pulse power transmitted by a transmitter was too low, sufficient, or too high.

Referring now to the drawings wherein like reference characters designate like or corresponding parts throughout the several views there is shown in FIG. 1 a transmitter 10 terminated through a sampling network 11 to its normal transmitter termination 12 such as an antenna, transducer, dummy load, or any other normal load for the particular system employed. The sampling network 11 is employed to couple off a small portion of the transmitted power to a sampling load 13. Where the sampling network 11 couples off power directly into the sampling load, such as is the case when waveguides are employed, the peak power dissipated in the sampling load is related to the transmitted power by the degree of coupling. In such a case, the peak voltage developed across the sampling load is related to the peak power dissipated in this load by the formula:

(1) $$V_p{}^2 = 2PR$$

where $V_p$ = the peak voltage developed across the sampling load
$P$ = the peak power dissipated in the sampling load
$R$ = the resistance of the sampling load.

A slightly different approach is, however, required to be used for lower frequencies where the sampling network 11 consists of a voltage divider. In such a case, the peak voltage developed across the sampling point is directly related to the peak power being transmitted by the formula:

(2) $$V_p{}^2 = 2PR/K^2$$

where $V_p$ = the peak voltage developed across the sampling point
$P$ = the peak power being transmitted and being dissipated in the normal transmitter termination
$R$ = the resistance of the transmitter load of transmitter termination
$K$ = the fraction of the output voltage that is used for sampling.

In both of the cases set forth above, the video pulse out of a detector 14 connected to sampling load 13 is equal to the peak voltage developed across the sampling point with insubstantial error.

As can be best seen in FIG. 1 the detector pulse, which may be termed a video pulse, is then fed from the detector 14 to a monostable multivibrator 16 and simultaneously to a plurality of level comparator circuits 17 through $17_n$. Of course, one less level comparator circuit is required than the number of discrete intervals of power desired. The monostable multivibrator 16 is triggered by pulses below the lowest level which it is desired to measure and the input video pulse amplitude may of course, for this purpose, be amplified or attenuated. Each level comparator 17 through $17_n$ is adjusted to generate a pulse output only when the pulse input exceeds the level set by a reference voltage therein. This level would, of course, be different for each level comparator in order to sense the discrete levels of pulse power. The output of each of the level comparators 17 through $17_n$ is employed to trigger a like number of monostable multivibrators 18, $18_1$ through $18_n$, the output of which along with the output of monostable multivibrator 16 is fed to an indicator 21 through logic circuitry 20. Since the logic circuitry employed in 20 depends on the type of indicator 21 employed and since the information transmitted regarding the pulse amplitude is in digital form of discrete steps, a digital or series of lights-type indicator 21 may be considered most advantageous although other types of indicators may be employed.

As can be best seen in FIG. 2, a video pulse is fed from a detector, such as detector 14 of FIG. 1 and by coupling capacitor 31, to NPN transistors 34 and 35 of the monostable multivibrator 16. Resistor 32 and diode 33 are employed primarily to shape the video signal into a positive trigger pulse which actuates the one-shot multivibrator or transistors 34 and 35. The duration of time the multivibrator remains triggered in an unstable state in response to the trigger pulse is determined by the RC constant of capacitor 36 and resistor 37. The duration of this unstable state is, of course, further controlled by the diode 40 in determining how heavy the conduction is at this point. The resistors 41 and 42 are connected to a positive voltage source for controlling the relative potential applied to the collectors of NPN transistors 34 and 35. Coupling resistor 43 is, of course, employed to sense the change of voltage on the collector of transistor 35, resistor 44, and diode 45 being connected to a negative voltage supply for applying bias voltages to the multivibrator. The output from the multivibrator 16 is directly coupled to resistors 50, 51, and 52 of a logic circuit 20.

While the video pulse from detector 14 is applied to the multivibrator 16 it is also fed to level comparators 17 and $17_1$. Since both the level comparators 17 and $17_1$ are identical only the comparator 17 will be described in detail and the components of comparator $17_1$ will differentiate from corresponding components in comparator 17 by employing an accent (').

The level at which a pulse will appear at the output of comparator 17 is determined by resistor 62 and the setting of resistor 63. When the level applied to the base of transistor 60 is below the reference voltage controlled by the biasing Zener diode 64 on the base of transistor 61, transistor 60 does not conduct. Thus, transistor 61 remains in a saturated state. However, if the video pulse exceeds this threshold bias transistor 60 conducts thereby driving transistor 61 into cutoff, causing a positive pulse to be generated on the collector of transistor 61. Therefore, a positive output pulse of approximately the same width as the input will be generated at the collector of transistor 61 only for input pulses exceeding a level determined by resistors 62 and 63.

Since the multivibrators 18 and $18_1$, to which are applied the outputs of level comparators 17 and $17_1$, respectively, through coupling capacitors 70 and 70', are identical to the multivibrator 16 already described, they will not be described in detail but will be differentiated one from the other merely by the use of accent placed on like reference numerals of corresponding parts. That is, the components of multivibrators 18 and $18_1$ will employ the reference numerals of multivibrator 16 except that multivibrator 18 will use a single accent (') and multivibrator $18_1$ will use a double accent (''). It should of course be understood that the multivibrators 18 and $18_1$ employ an output from both their respective transistors 34' and 35', and 34'' and 35''.

The controlled rectifiers 80, 81, and 82, which may also be termed gated diodes, are each connected in series with a respective neon light 83, 84, and 85, the resistors 50, 51, and 52 being employed as current limiting resistors. Diodes 90 through 95 are diodes employed in the logic circuitry 20. In order to light any one of the three indicator lamps 83, 84, or 85, the corresponding controlled rectifiers 80, 81, or 82 must receive a positive gate. The discussion of the operation of these lamps and the conditions of lighting will be considered separately.

If the inpunt video pulse from detector 16 is of sufficient amplitude it triggers the multivibrator 16 and at the same time overcomes the threshold bias of the level comparators 17 and $17_1$ causing them to pass on a square wave to the following multivibrator circuits 18 and $18_1$. This square wave triggers transistors 34' and 34'' into conduction while respectively driving transistors 35' and 35'' into cutoff. As a result the cathodes of the diodes 90 and 91 connected to multivibrator 18 and the cathode of diode 93 of multivibrator $18_1$ become positive while negative voltages appear on the cathode of diode 92 of multivibrator 18 and on the cathodes of diodes 94 and 95 of multivibrator $18_1$. Once a negative potential has been placed on the cathode of any one of these diodes, the corresponding controlled rectifier gates 80, 81, and 82 which are connected to these diodes are clamped to a negative potential, and therefore cannot conduct. Thus, in this example controlled rectifier gates 81 and 82 are clamped from conduction and only controlled rectifier 80 can conduct. Therefore, neon lamp 83 lights and this lamp remains lit for the duration of the pulse from transistor 35 of multivibrator 16 and beyond, until the 115 volts A.C. goes negative.

For the next situation it may be assumed that the incoming video pulse is of sufficient amplitude to trigger the multivibrator 16 and to overcome the threshold bias on the level comparator 17, but only sufficient to trigger the multivibrator 18 alone. Thus, multivibrator 34' conducts and 35' is cut off making diodes 90 and 91 of multivibrator 18 the diodes wth the postive cathodes and diode 92 with the negative cathode. Since multivibrator $18_1$ has not been triggered, multivibrator 34'' is not conducting and the cathodes of diodes 94 and 95 are connected to a positive potential of about 22.5 volts from the positive power supply of multivibrator $18_1$. However, since transistor 35'' of multivibrator $18_1$ is now conducting heavily, the cathode of diode 93 is at a negative potential. Thus controlled rectifier 80 cannot be gated on and therefore lamp 83 cannot be lit because of the negative potential on diode 93. Since the cathode of diode 92 is also negative, because the multivibrator had just been triggered, diode 92 places a negative potential on the gate electrode of rectifier 82. As a result neon lamp 85 also is prevented from lighting. The total result of a video input pulse of this amplitude then is to turn on only the neon lamp 84, since diodes 91 and 94 are applying only positive potentials to diode 81. In the last condition the incoming video pulse is assumed to be just high enough in potential to trigger the multivibrator 16 and, therefore, the level comparators 17 and $17_1$ do not change, as the incoming pulse is not high enough to overcome their threshold biases. Thus, diodes 94 and 95 of multivibrator $18_1$ and diode 92 of multivibrator 18 have a positive potential on their cathodes. Since the cathodes of diodes 90 and 91 are negative as is the cathode of diode 93, the only controlled rectifier which can be gated on is rectifier 82 so that only the neon lamp 85 lights.

Obviously, many modifications and variations of the present invention such as measuring the amplitude of radio pulses are possible in light of the above teachings. It is, therefore, to be understood that within the scope of the appended claims the invention may be practiced otherwise than as specifically described.

What is claimed is:

1. A system for measuring pulse power levels comprising means for generating a signal proportional to the pulse power level of a monitored system; a first monostable multivibrator connected to said signal generating means for producing an output pulse indicative of the lowest power level to be measured; a first level comparator having first and second transistors with their emitters connected together and an input lead connected from the base of the first transistor to said signal generating means, an adjustable resistance connected between the base of the first transistor and ground, and a diode rectifier connected between the base of the second transistor and ground, said first level comparator providing an output pulse indicative of a medium power level to be measured; a second monostable multivibrator connected to the output of said first level comparator and to be triggered by the output thereof; a second level comparator having third and fourth transistors with their emitters connected together and an output lead connected from the base of the third transistor to said signal generating means, an adjustable resistance connected between the base of the third transistor and ground, and a diode rectifier connected between the base of the fourth transistor and ground, said second level comparator providing an output pulse indicative of the highest power level to be measured; a third monostable multivibrator connected to the output of said second level comparator and to be triggered by the output thereof; indicator means; and a diode gate system for gating the outputs of the first, second and third monostable multivibrators to said indicator means.

2. A system for measuring pulse power levels as claimed in claim 1 wherein said diode gate system comprises first, second, and third controlled rectifier gates connected in parallel between the output of said first multivibrator and said indicator means; first and second diode rectifiers connected in parallel to the output of said second multivibrator, said first and second diode rectifiers being respectively connected in parallel to the inputs of said first and second controlled rectifier gates; a third diode rectifier connected to the output of said second multivibrator and to the input of said third controlled rectifier gate; a fourth diode rectifier connected to the output of said third multivibrator and to the input of said first controlled rectifier gate; fifth and sixth diode rectifiers connected in parallel to the output of said third multivibrator, said fifth and sixth diode rectifiers being respectively connected in parallel to the input of said second and third controlled rectifier gates whereby one of said first, second, and third controlled rectifier gates which has a positive potential and lacks a negative potential applied at the input thereof energizes said indicator means.

3. A system for measuring pulse power levels as claimed in claim 2 wherein said indicator means comprises first, second, and third lamp means respectively connected between said first, second, and third controlled rectifier gates and an alternating voltage source.

4. A system for measuring pulse power levels as claimed in claim 3 wherein said signal generating means comprises a sampling means for coupling a portion of the power from said monitored system to a sampling load, and means for detecting the peak power dissipated in the sampling load.

References Cited by the Examiner
UNITED STATES PATENTS 2,541,039  2/1951  Cole.
2,774,535  12/1956  Anderson.
2,806,651  9/1957  Fernsler.

WALTER L. CARLSON, *Primary Examiner.*

FREDERICK M. STRADER, *Examiner.*

D. R. GREENE, J. MULROONEY,
*Assistant Examiners.*